(12) United States Patent
Kwag et al.

(10) Patent No.: US 8,715,851 B2
(45) Date of Patent: May 6, 2014

(54) BATTERY PACK AND BATTERY PACK STACK

(75) Inventors: Nohyun Kwag, Yongin-si (KR); Jinhong An, Yongin-si (KR); Kyungwon Seo, Yongin-si (KR); Wansuk Doh, Yongin-si (KR); Jeongdeok Byun, Yongin-si (KR); Jungyup Han, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 543 days.

(21) Appl. No.: 12/940,397

(22) Filed: Nov. 5, 2010

(65) Prior Publication Data

US 2011/0129719 A1 Jun. 2, 2011

(30) Foreign Application Priority Data

Nov. 27, 2009 (KR) .................. 10-2009-0115964

(51) Int. Cl.
*H01M 2/24* (2006.01)
(52) U.S. Cl.
USPC .......................................... 429/159; 429/158
(58) Field of Classification Search
USPC ................................ 429/159, 158; 29/623.1
See application file for complete search history.

(56) References Cited

U.S. PATENT DOCUMENTS

| | | | |
|---|---|---|---|
| 5,172,043 A | 12/1992 | Toops | |
| 6,923,837 B2 | 8/2005 | Longhi, Jr. et al. | |
| 7,426,405 B2 | 9/2008 | Lee | |
| 7,481,852 B2 | 1/2009 | Longhi, Jr. et al. | |
| 7,609,034 B2 | 10/2009 | Tanjou | |
| 2003/0162086 A1 | 8/2003 | Longhi, Jr. et al. | |
| 2003/0165736 A1 | 9/2003 | Hiratsuka | |
| 2003/0224246 A1* | 12/2003 | Watanabe et al. ............. | 429/159 |
| 2004/0197642 A1 | 10/2004 | Sato | |
| 2005/0058900 A1 | 3/2005 | Benson et al. | |
| 2007/0210746 A1 | 9/2007 | Tanjou | |
| 2008/0299452 A1 | 12/2008 | Nakazawa | |
| 2009/0053585 A1 | 2/2009 | Nakazawa | |

(Continued)

FOREIGN PATENT DOCUMENTS

| | | |
|---|---|---|
| JP | 10064771 | 3/1998 |
| JP | 2008198435 | 8/2008 |

(Continued)

OTHER PUBLICATIONS

Korean Notice of Allowance issued by KIPO, dated Apr. 23, 2011, corresponding to Korean Patent Application No. 10-2009-0115964, together with Request for Entry.

*Primary Examiner* — Mark F Huff
*Assistant Examiner* — Monique Wills
(74) *Attorney, Agent, or Firm* — Robert E. Bushnell, Esq.

(57) ABSTRACT

A battery pack includes battery cells, each including a first conductive terminal and a second conductive terminal, the battery cells being arrayed from a first side to a second side of the battery pack. A first conductive tab electrically connects the first conductive terminals of the battery cells to each other, a second conductive tab electrically connects the second conductive terminals of the battery cells to each other, a first conductive external terminal is electrically connected to a side of the first conductive tab and is configured to be electrically connected to an external device, and a second conductive external terminal is electrically connected to a side of the second conductive tab and is configured to be electrically connected to the external device.

18 Claims, 9 Drawing Sheets

(56) References Cited

U.S. PATENT DOCUMENTS

| | | |
|---|---|---|
| 2009/0098417 A1 | 4/2009 | Yamada et al. |
| 2009/0214941 A1 | 8/2009 | Buck et al. |
| 2009/0220851 A1 | 9/2009 | Nakazawa et al. |
| 2011/0293997 A1* | 12/2011 | Tartaglia ..................... 429/159 |

FOREIGN PATENT DOCUMENTS

| | | |
|---|---|---|
| JP | 2009140616 | 6/2009 |
| KR | 10-1999-000479 | 1/1999 |
| KR | 20-2004-0086796 | 10/2004 |
| KR | 10-2006-0060077 | 6/2006 |

* cited by examiner

BATTERY PACK AND BATTERY PACK STACK

CLAIM OF PRIORITY

This application makes reference to, incorporates the same herein, and claims all benefits accruing under 35 U.S.C. §119 from an application earlier filed in the Korean Intellectual Property Office on 27 Nov. 2009 and there duly assigned Serial No. 10-2009-0115964.

BACKGROUND OF THE INVENTION

1. Field of the Invention

The present invention relates to a battery pack and a battery pack stack.

2. Description of the Related Art

In general, a battery pack used in portable external electronic devices, such as notebook computers, personal digital assistants (PDAs), and camcorders, is fabricated by combining a number of battery cells into a single unit due to the limited capacity of just one battery cell. Furthermore, a plurality of battery packs, electrically connected to each other in a stacked structure, are used in devices, such as electric vehicles and uninterruptable power supplies (UPSs), which have larger capacity requirements than portable electronic devices.

When a battery pack accommodates a plurality of battery cells which are electrically connected to each other in parallel, both a positive electrode and a negative electrode are extended from a battery cell at one side and electrically connected to an external device. In the same manner, when a battery pack stack includes a plurality of battery packs which are electrically connected to each other in parallel, both a positive electrode and a negative electrode are extended from a battery pack at one side and electrically connected to an external device.

However, when a battery pack or battery pack stack connected to an external device is charged or discharged, the charge/discharge rate of the battery cell or battery pack disposed on the side where the positive and negative electrodes are extended is higher than that of the battery cell or battery pack disposed on the opposite side. Thus, the amount of heat generated from the battery cell or battery pack at the side where both the positive and negative electrodes are extended is greater than the amount of heat generated from the battery cell or battery pack at the opposite side. In this state, as the number of charge/discharge cycles increases, degradation of the battery cell or battery pack at the side where both the positive and negative electrodes are extended becomes serious. Thus, discrepancies in service life arise between the battery cells or battery packs.

SUMMARY OF THE INVENTION

The present invention is directed to a battery pack and a battery pack stack which substantially overcome one or more of the problems due to the limitations and disadvantages of the related art.

It is, therefore, a feature of the present invention to provide a battery pack and a battery pack stack which can improve a balance between a plurality of battery cells or between a plurality of battery packs.

At least one of the above and other features and advantages may be realized by providing a battery pack which includes: a plurality of battery cells, each including a first conductive terminal and a second conductive terminal, the battery cells being arrayed from a first side to a second side; a first conductive tab electrically connecting the first conductive terminals of the battery cells to each other; a second conductive tab electrically connecting the second conductive terminals of the battery cells to each other; a first conductive external terminal electrically connected to the first conductive tab at the first side and configured to be electrically connected to an external device; and a second conductive external terminal electrically connected to the second conductive tab at the second side and configured to be electrically connected to the external device.

The battery pack may further include a battery case accommodating the battery cells, and may be configured to fix the first and second conductive external terminals.

The first conductive external terminal may be disposed at an upper side of the battery cell, and the second conductive external terminal may be disposed at a lower side of the battery cell.

The first and second conductive external terminals may be disposed in a side surface of the battery case.

The first and second conductive external terminals may be disposed in an upper surface of the battery case.

The first and second conductive tabs may have plate shapes, and may be formed of one of nickel (Ni), copper (Cu), aluminum (Al), an equivalent thereof, and a combination thereof.

The first conductive tab may be electrically connected to the first conductive external terminal through a first conductive wire, and the second conductive tab may be electrically connected to the second conductive external terminal through a second conductive wire.

A portion where the first conductive tab is connected to the first conductive wire may be an end of the first conductive tab, a portion where the second conductive tab is connected to the second conductive wire may be an end of the second conductive tab, and the end of the first conductive tab may be opposite to the end of the second conductive tab with respect to the battery cells arrayed from the first side to the second side.

The battery cell may include a cylinder type secondary battery.

At least one of the above and other features and advantages may be realized by providing a battery pack stack which includes: a plurality of battery packs, each including a first conductive external terminal and a second conductive external terminal, the battery packs being arrayed from a first end to a second end; a first conductive external tab including a first contact at the first end and electrically connecting the first conductive external terminals to each other; and a second conductive external tab including a second contact at the second end and electrically connecting the second conductive external terminals to each other; wherein the first and second contacts are connected to an external device.

The battery pack may include: a plurality of battery cells, each including a first conductive terminal and a second conductive terminal, and electrically connected to each other; and a battery case accommodating the battery cells and configured to fix the first and second conductive external terminals.

The battery cells may be electrically connected to each other in series.

The battery cells may be electrically connected to each other in parallel.

The battery pack may include: a first conductive tab electrically connecting the first conductive terminals of the battery cells to each other; and a second conductive tab electrically connecting the second conductive terminals of the battery cells to each other; wherein the battery cells are arrayed from a first side to a second side, the first conductive tab being electrically connected to the first conductive external terminal at the first side, and the second conductive tab being electrically connected to the second conductive external terminal at the second side.

The first conductive external terminal may be disposed at an upper side of the battery cell, and the second conductive external terminal may be disposed at a lower side of the battery cell.

The first and second conductive external terminals may be disposed in a side surface of the battery case.

The first and second conductive external terminals may be disposed in an upper surface of the battery case.

The battery cell may include a cylinder type secondary battery.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Exemplary embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the invention to those skilled in the art.

Hereinafter, embodiments will be described in detail with reference to the accompanying drawings.

Figure 1:
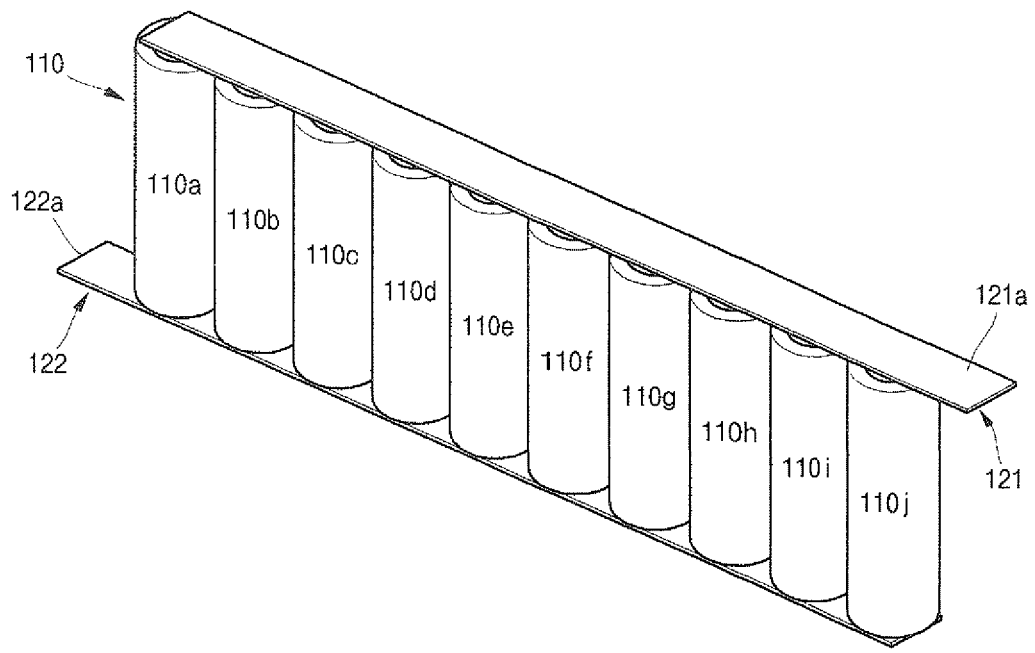
FIG. 1 is a perspective view illustrating the coupling of battery cells and conductive tabs of a battery pack according to an embodiment of the invention.
Figure 2:
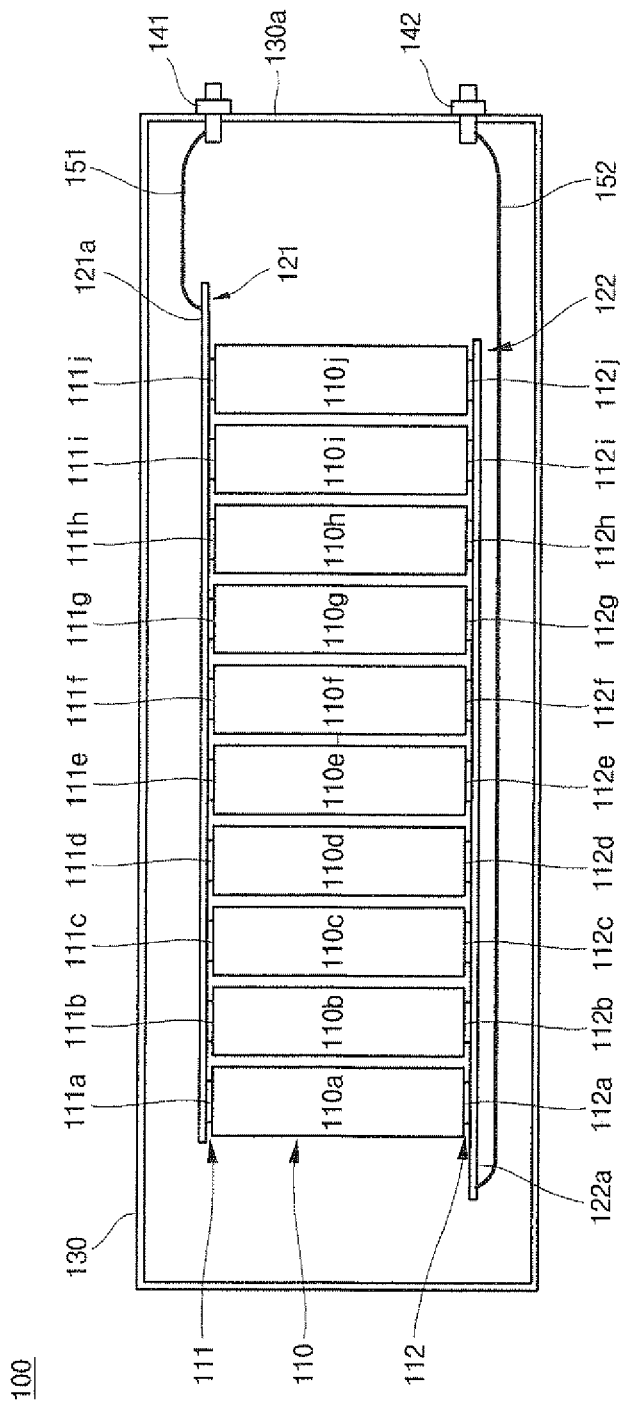
FIG. 2 is a plan view illustrating the battery pack of FIG. 1.

FIG. 1 is a perspective view illustrating the coupling of battery cells and conductive tabs of a battery pack according to an embodiment, and FIG. 2 is a plan view illustrating the battery pack of FIG. 1.

Referring to FIGS. 1 and 2, a battery pack 100 may include a plurality of battery cells 110, a first conductive tab 121, a second conductive tab 122, a battery case 130, a first conductive external terminal 141, a second conductive external terminal 142, a first conductive wire 151 and a second conductive wire 152.

Each of the battery cells 110 may include a first conductive terminal 111 and a second conductive terminal 112. The battery cell 110 may have a cylindrical shape. A secondary battery which is rechargeable may be used as the battery cell 110. Specifically, a cylinder type lithium secondary battery may be used, such a secondary battery having a high operation voltage of about 3.6 V or greater, and a high energy density per unit weight. The number of battery cells 110 in FIGS. 1 and 2 is ten, but the present disclosure is not limited thereto. The battery cells 110 are classified into first through tenth battery cells 110a, 110b, 110c, 110d, 110e, 110f, 110g, 110h, 110i and 110j, which may be arrayed in parallel from one side to another side.

The first conductive terminal 111 may be disposed on the upper side of the battery cell 110, and may be electrically connected to a positive electrode of an electrode assembly (not shown) in the battery cell 110 so as to have a positive pole.

The second conductive terminal 112 may be disposed on the lower side of the battery cell 110, and may be electrically connected to a negative electrode of the electrode assembly in the battery cell 110 so as to have a negative pole.

The first conductive tab 121 is electrically connected to the first conductive terminals 111, which may be denoted by 111a, 111b, 111c, 111d, 111e, 111f, 111g, 111h, 111i and 111j, respectively, of the first through tenth battery cells 110a, 110b, 110c, 110d, 110e, 110f, 110g, 110h, 110i and 110j, respectively. The first conductive tab 121 may have a plate shape. A first contact 121a may be disposed on a side of the first conductive tab 121. The first contact 121a may be in direct contact with, and electrically connected to, the first conductive external terminal 141 which will be described later, or electrically connected to the first conductive external terminal 141 through a conductive material. The first conductive tab 121 may be formed of one of nickel (Ni), copper (Cu), aluminum (Al), an equivalent thereof, and a combination thereof, but the present disclosure is not limited thereto.

The second conductive tab 122 is electrically connected to the second conductive terminals 112, which may be denoted by 112a, 112b, 112c, 112d, 112e, 112f, 112g, 112h, 112i and 112j, respectively, of the first through tenth battery cells 110a, 110b, 110c, 110d, 110e, 110f, 110g, 110h, 110i and 110j, respectively. The second conductive tab 122 may have a plate shape. A second contact 122a may be disposed on a side of the second conductive tab 122. A portion where the second contact 122a is disposed is opposite to a portion where the first contact 121a is disposed with respect to the battery cells arrayed from one side to another side. The second contact 122a may be in direct contact with, and electrically connected to, the second conductive external terminal 142 which will be described later, or electrically connected to the second conductive external terminal 142 through a conductive material. The second conductive tab 122 may be formed of one of nickel (Ni), copper (Cu), aluminum (Al), an equivalent thereof, and a combination thereof, but the present disclosure is not limited thereto.

The battery case 130 may have a box shape with an inner space. The battery case 130 may store the battery cells 110, the first conductive tab 121, and the second conductive tab 122 in its inner space. The first and second conductive external terminals 141 and 142, respectively, which will be described later, may be fixed to the battery case 130. The battery case 130 may be formed of electrically insulating resin. The battery case 130 accommodates the battery cells 110 so as to protect them from environmental hazards such as shock and dust.

The first conductive external terminal 141 may be disposed in a side surface 130a of the battery case 130 near the battery cell 110j which is disposed on the right side closest to the first contact 121a of the first conductive tab 121. The first conductive external terminal 141 may be electrically connected to the first contact 121a of the first conductive tab 121. The first conductive external terminal 141 may be exposed outside the battery case 130 so as to be electrically connected to another battery pack or an electronic device.

The second conductive external terminal 142 may be disposed in the side surface 130a of the battery case 130 provided with the first conductive external terminal 141. The second conductive external terminal 142 may be electrically connected to the second contact 122a of the second conductive tab 122. The second conductive external terminal 142 may be exposed outside the battery case 130 so as to be electrically connected to another battery pack or an electronic device.

Since the first conductive external terminal 141 and the second conductive external terminal 142 are disposed in the side surface 130a of the battery case 130, a battery pack stack can be formed by repeatedly stacking the battery pack 100.

The first conductive wire 151 may electrically connect the first contact 121a of the first conductive tab 121 to the first conductive external terminal 141. The first conductive wire 151 is disposed at the side surface 130a of the battery case 130 close to the first contact 121a of the first conductive tab 121, and thus it is relatively short. The first conductive wire 151 may be a conducting wire which is formed of one of nickel (Ni), copper (Cu), aluminum (Al), an equivalent thereof, and a combination thereof, and which includes a sheathe formed of electrically insulating resin, but the present disclosure is not limited thereto.

The second conductive wire 152 may electrically connect the second contact 122a of the second conductive tab 122 to the second conductive external terminal 142. The second conductive wire 152 is disposed at the side surface 130a of the battery case 130 far from the second contact 122a of the second conductive tab 122, and thus is relatively long. The second conductive wire 152 may be a conducting wire which is formed of one of nickel (Ni), copper (Cu), aluminum (Al), an equivalent thereof, and a combination thereof, and which includes a sheathe formed of electrically insulating resin, but the present disclosure is not limited thereto.

Hereinafter, a configuration of a battery pack will be described according to another embodiment of the invention.

Figure 3:
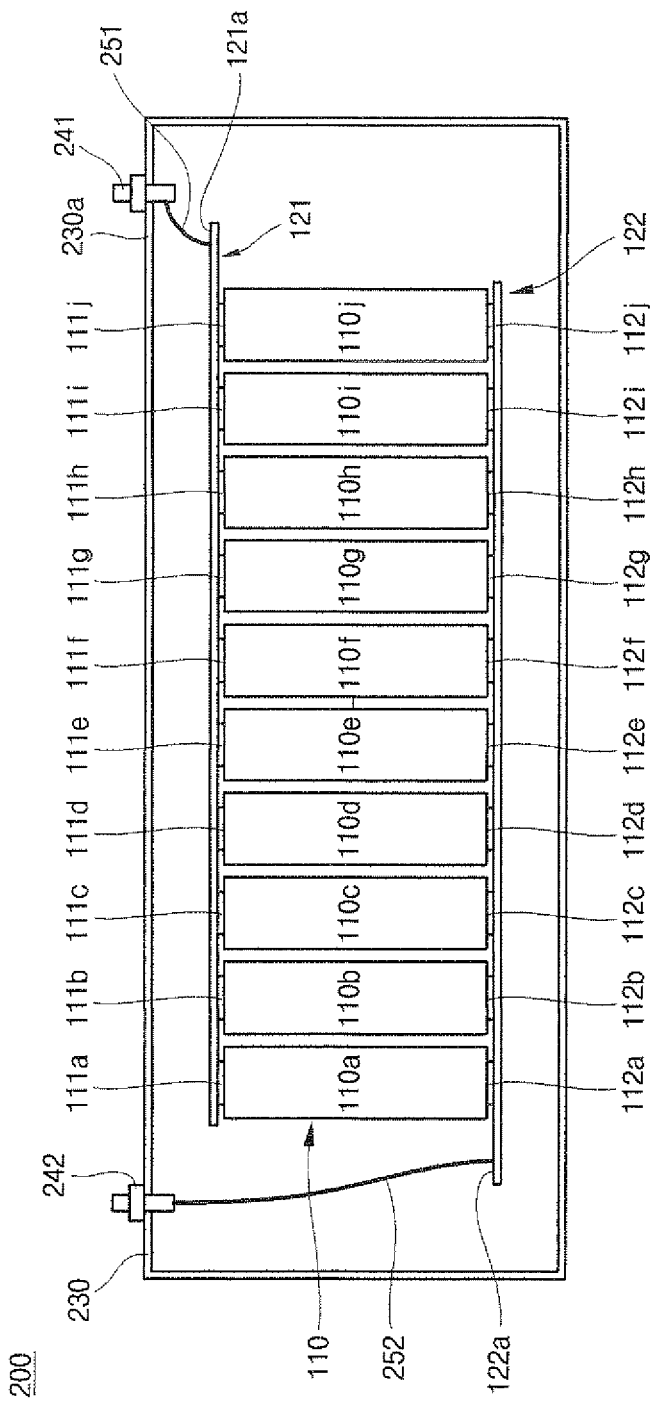
FIG. 3 is a plan view illustrating a battery pack according to another embodiment of the invention.

FIG. 3 is a plan view illustrating a battery pack according to another embodiment of the invention.

Referring to FIG. 3, the battery pack 200 is different from the battery pack 100 of FIGS. 1 and 2, and it includes a battery case 230, a first conductive external terminal 241, a second conductive external terminal 242, a first conductive wire 251, and a second conductive wire 252. The battery pack 200 will now be descried with respect to the battery case 230, the first conductive external terminal 241, the second conductive external terminal 242, the first conductive wire 251, and the second conductive wire 252. Like reference numerals denote like elements in the current embodiment and the previous embodiment, and thus descriptions thereof will be omitted.

The battery case 230 may have a box shape with an inner space. The battery case 230 may store the battery cells 110, the first conductive tab 121, and the second conductive tab 122 in its inner space. The first and second conductive external terminals 241 and 242, which will be described later, may be fixed to the battery case 230. The battery case 230 may be formed of electrically insulating resin. The battery case 230 accommodates the battery cells 110 so as to protect them from environmental hazards such as shock and dust.

The first conductive external terminal 241 may be disposed in an upper surface 230a of the battery case 230 adjacent to the upper portions of the battery cells 110. The first conductive external terminal 241 may be electrically connected to the first contact 121a of the first conductive tab 121. The first conductive external terminal 241 may be exposed outside the battery case 230 so as to be electrically connected to another battery pack or an electronic device.

The second conductive external terminal 242 may be disposed in the upper surface 230a of the battery case 230 adjacent to the upper portions of the battery cells 110. The second conductive external terminal 242 may be electrically connected to the second contact 122a of the second conductive tab 122. The second conductive external terminal 242 may be exposed outside the battery case 230 so as to be electrically connected to another battery pack or an electronic device.

As described above, the battery pack 200 includes the first and second conductive external terminals 241 and 242 in the upper surface 230a of the battery case 230. Thus, in comparison to the case of the battery pack 100, the distance between the first contact 121a of the first conductive tab 121 and the first conductive external terminal 241, and the distance between the second contact 122a of the second conductive tab 122 and the second conductive external terminal 242, are relatively short. Thus, the first conductive wire 251 and the second conductive wire 252 may be relatively short. Although the first conductive wire 251 and the second conductive wire 252 function as tiny inner resistors of the battery pack 200, since the first conductive wire 251 and the second conductive wire 252 are relatively short as described above, the inner resistance is relatively decreased so as to improve the efficiency of the battery pack 200.

The first conductive wire 251 may electrically connect the first contact 121a of the first conductive tab 121 to the first conductive external terminal 241. The first conductive wire 251 may be a conducting wire which is formed of one of nickel (Ni), copper (Cu), aluminum (Al), an equivalent thereof, and a combination thereof, and which includes a sheathe formed of electrically insulating resin, but the present disclosure is not limited thereto.

The second conductive wire 252 may electrically connect the second contact 122a of the second conductive tab 122 to the second conductive external terminal 242. The second conductive wire 252 may be a conducting wire which is formed of one of nickel (Ni), copper (Cu), aluminum (Al), an equivalent thereof, and a combination thereof, and which includes a sheathe formed of electrically insulating resin, but the present disclosure is not limited thereto.

Thus, in the battery pack configured according to the current embodiment, the charge/discharge speed of a battery cell disposed on one side is similar to that of a battery cell disposed on another side. In addition, in contrast to the temperature of a battery cell disposed on one side of a related art battery pack being significantly different from the temperature of a battery cell disposed on another side, temperature variation between the battery cells in the battery pack according to the current embodiment is small. Thus, the service life distribution of the battery cells is uniform. That is, in the battery pack according to the current embodiment, a balance between the battery cells is well maintained.

Hereinafter, temperature variation of a battery cell versus capacity and discharge time per cycle of a battery pack will be described according to an embodiment of the invention.

Figure 4:
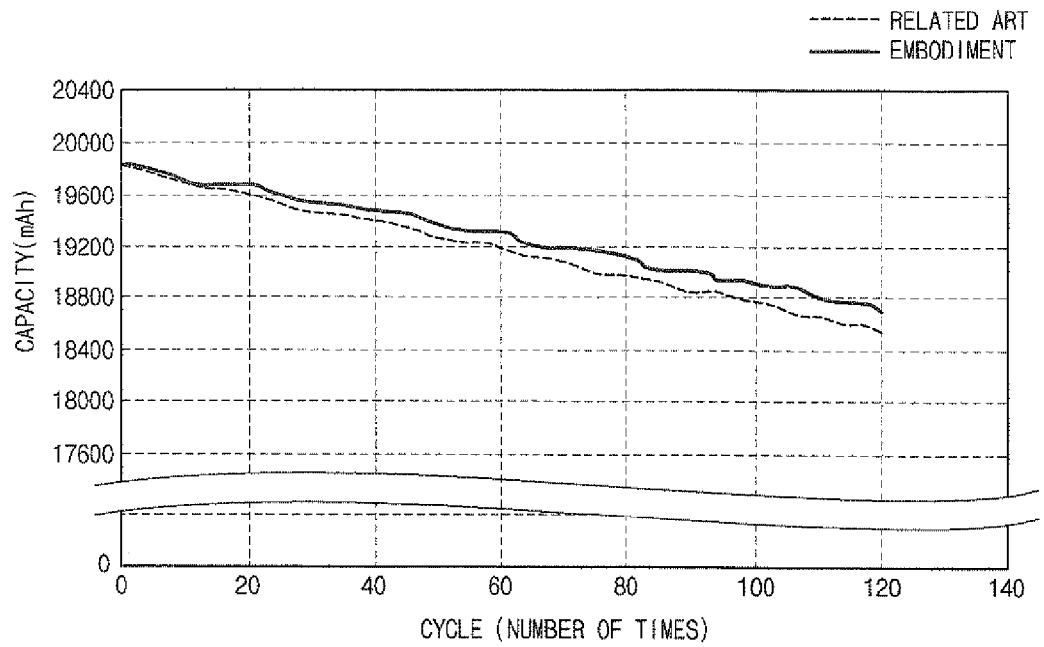
FIG. 4 is a graph illustrating variation in capacity per cycle of a battery pack according to an embodiment of the invention, and capacity per cycle of a battery pack of the related art.

FIG. 4 is a graph illustrating variation in capacity per cycle of a battery pack according to an embodiment of the invention, and capacity per cycle of a battery pack of the related art.

Referring to FIG. 4, the horizontal axis represents cycle (number of times) of a battery pack, and the vertical axis represents capacity (mAh). The dotted curve represents capacity variation per cycle of a battery pack of the related art, which battery back includes ten battery cells connected in parallel, and both positive and negative electrodes extend from one of the ten battery cells. The solid curve shows capacity variation per cycle of the battery pack of FIG. 2. In the related art battery pack and the battery pack of FIG. 2, constant current charging processes were performed with a current of about 15 A being maintained in the beginning. Then, when the battery packs reached a full charge voltage of about 4.25 V, constant voltage charge processes were performed to reduce the amount of current to about 1000 mA, and the battery packs were left as they were for about 10 minutes. Thereafter, the battery pack of the related art and the battery pack of the invention were discharged such that a current of about 15 A flowed out. Then, when the voltage of the battery packs dropped to about 3 V, the discharge was stopped, and the battery packs were left as they were for about 10 minutes. The battery pack of the related art and the battery pack of the invention were repeatedly charged and discharged under the above condition, and then the capacities thereof were compared. The battery packs had an identical capacity at the beginning of the test, and the cycle of charge and discharge was repeated 120 times. At this point, the capacity of the battery pack of the related art was less than that of the battery pack of the invention by about 150 mAh.

When the charge/discharge of the battery pack of the related art is controlled, the full charge or full discharge occurs at the battery cell from which the positive and negative electrodes extend, so that the battery cell is further degraded. Thus, the charge/discharge of the battery pack of the related art is controlled according to the state of the battery cell from which the positive and negative electrodes extend. Accordingly, charge or discharge of the battery pack is repeated in the state where the other battery cells are insufficiently charged or discharged. As a result, the entire capacity of the battery pack is rapidly reduced.

However, in the battery pack of the invention, since the positive electrode and the negative electrode of the battery cells respectively extend from two different sides, the charge/discharge of the battery cells is uniformly performed. Thus, as illustrated in FIG. 4, the battery pack of the invention experiences a capacity reduction due to repeated charge/discharge which is less than that of the battery pack of the related art.

Figure 5:
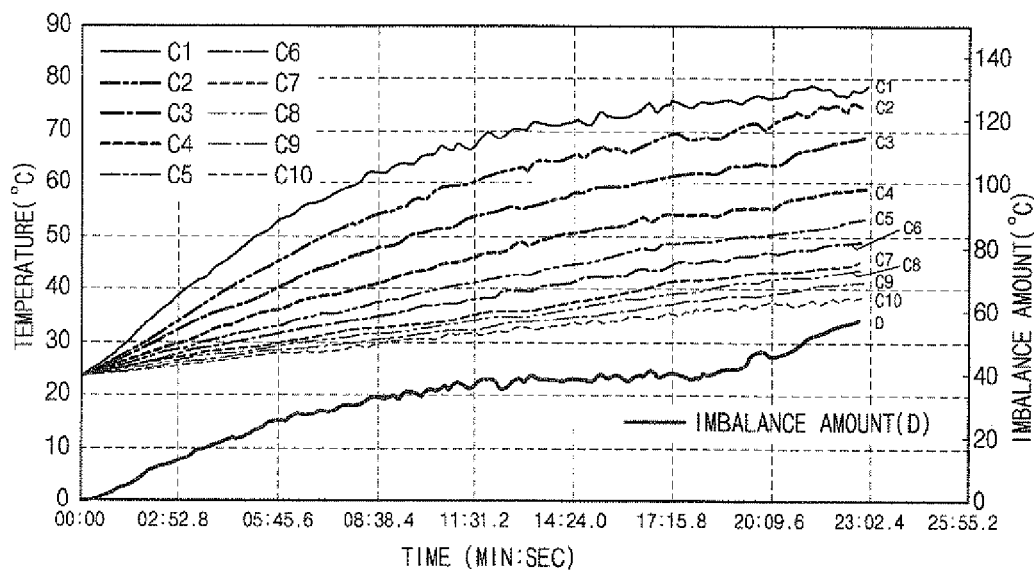
FIG. 5 is a graph illustrating temperature variation of battery cells of the related art over time when a battery pack is discharged.
Figure 6:
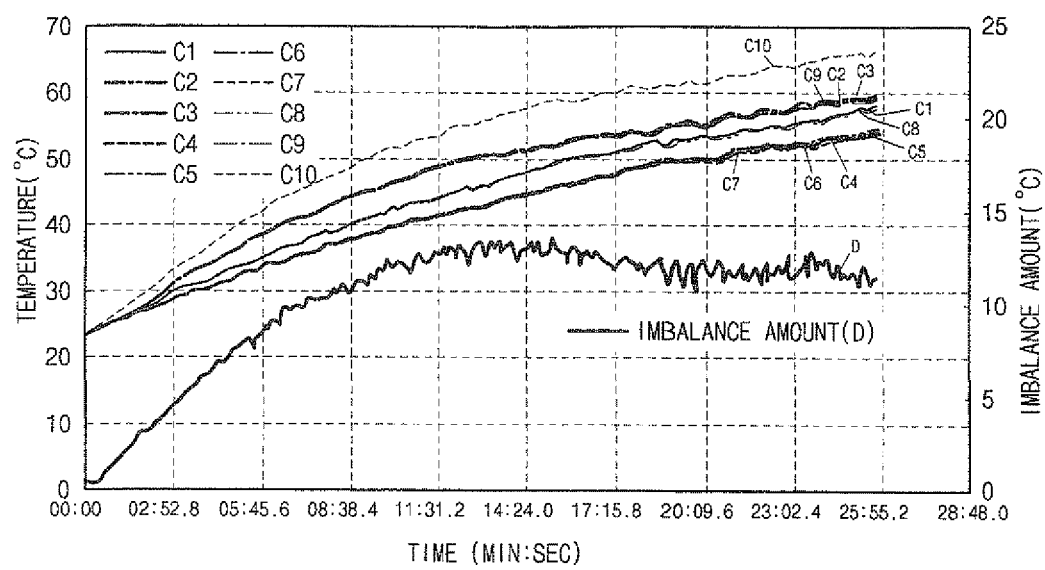
FIG. 6 is a graph illustrating temperature variation of battery cells of the related art over time when a battery pack is discharged according to an embodiment.

FIG. 5 is a graph illustrating temperature variation of battery cells of the related art over time when a battery pack is discharged, while FIG. 6 is a graph illustrating temperature variation of battery cells of the invention over time when a battery pack is discharged.

Referring to FIG. 5, the horizontal axis of the graph represents time (minute:second), the left vertical axis represents temperature (° C.) of the battery cells, and the right vertical axis represents an imbalance amount D (° C.) between the battery cells. The imbalance amount D represents the temperature difference between a battery cell having the highest temperature and a battery cell having the lowest temperature among the battery cells. In the battery pack of the related art, the battery cells are arrayed in parallel from one side to another side, and are electrically connected to each other in parallel. In addition, both the positive and negative electrodes extend from the battery cell on one side. In a test, the temperature of the battery cell on the side from which the positive and negative electrodes extend was denoted by C1, and the temperatures of the battery cells arrayed toward another side were sequentially denoted by C2 through C10. In addition, the battery pack of the related art was discharged at a current of about 40 A.

The temperature of the battery cells, discharged at about 24° C. at the beginning of the test, was increased over time. In this case, temperature differences between the battery cells were obvious as illustrated in the graph. Specifically, when about 23 minutes elapsed after the start of discharge, the temperature C1 of the battery cell on the side from which the negative electrode and the positive electrode extended was about 78° C., which was highest among the temperatures of the battery cells. Conversely, when about 23 minutes elapsed after the start of discharge, the temperature C10 of the battery cell disposed on the other side, farthest from the battery cell on the first side, was about 40° C., which was lowest among the temperatures of the battery cells. That is, the imbalance amount D of the battery pack of the related art was about 38° C. when about 23 minutes elapsed after the start of discharge. As such, in the battery pack of the related art, the temperature differences between the battery cells were increased.

Referring to FIG. 6, the horizontal axis of the graph represents time (minute:second), the left vertical axis represents temperature (° C.) of the battery cells, and the right vertical axis represents an imbalance amount D (° C.) between the battery cells. The imbalance amount D represents the temperature difference between a battery cell having the highest temperature and a battery cell having the lowest temperature among the battery cells. In a test performed on the battery pack illustrated in FIG. 2, the temperature of the battery cell 110$j$ on the side from which the positive electrode extends was denoted by C1, and the temperatures of the sequentially arrayed ninth through second battery cells 110$i$, 110$h$, 110$g$, 110$f$, 110$e$, 110$d$, 110$c$, 110$b$ were respectively denoted by C2 through C9. The temperature of the battery cell 110$a$ on the other side from which the negative electrode extends is denoted by C10. In addition, the battery pack of FIG. 2 was discharged at a current of about 40 A.

The temperature of the battery cells, discharged at about 24° C. at the beginning of the test, was increased over time. When about 23 minutes elapsed after the start of discharge, the temperature C10 of the battery cell on the side from which the negative electrode extended was about 65° C. which was highest among the temperatures of the battery cells. This temperature is significantly low considering the case of the battery pack of the related art under the same test conditions. That is, in the battery pack of the related art, the temperature of the battery cell on the side from which the negative and positive electrodes extended was about 78° C. In the battery pack of FIG. 2, the temperatures C5 and C6 of the battery cells in the middle were about 55° C., which was lowest among the temperatures of the battery cells. The imbalance amount D of the battery pack of FIG. 2 was about 10° C. when about 23 minutes elapsed after the start of discharge. This was significantly lower than the imbalance amount D of the battery pack of the related art. Thus, the balance between the battery cells of the battery pack of FIG. 2 was improved.

Hereinafter, a configuration of a battery pack stack will be described according to an embodiment of the invention.

Figure 7:
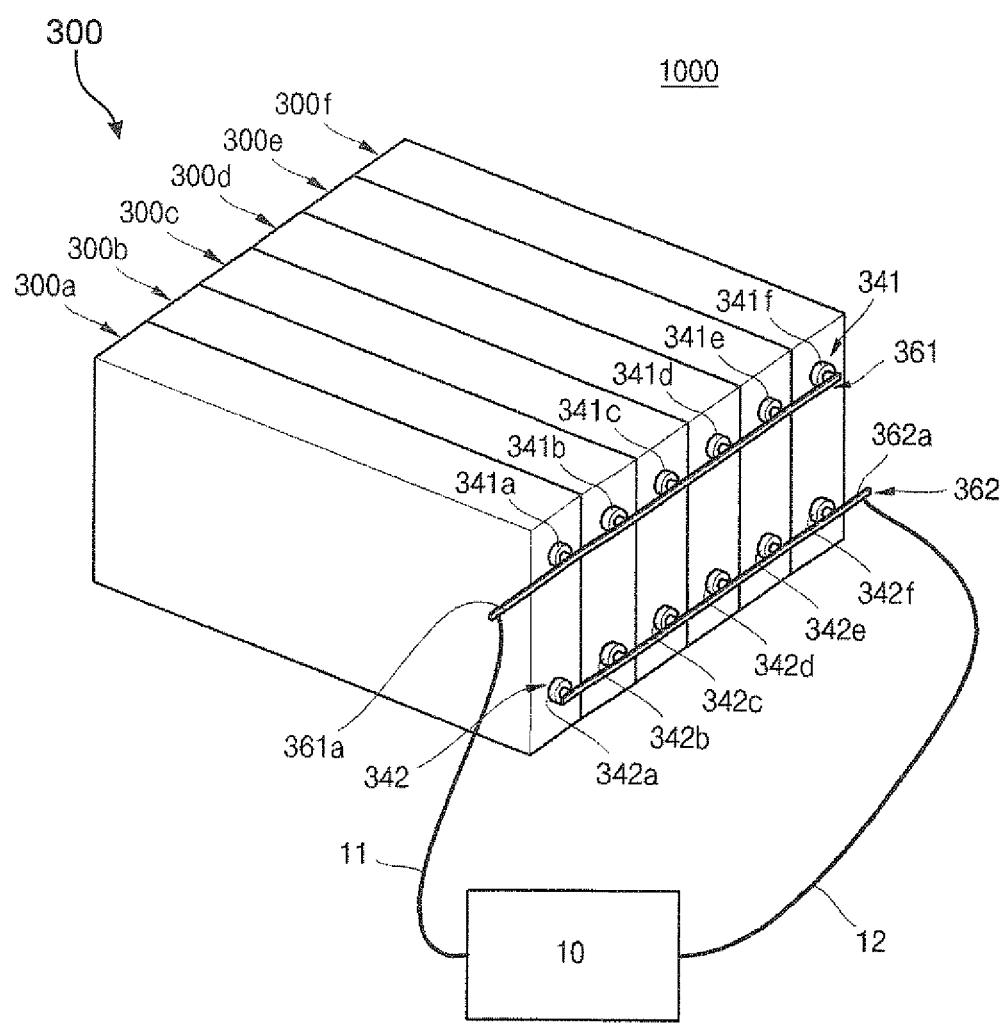
FIG. 7 is a perspective view illustrating a battery pack stack according to an embodiment of the invention.
Figure 8:
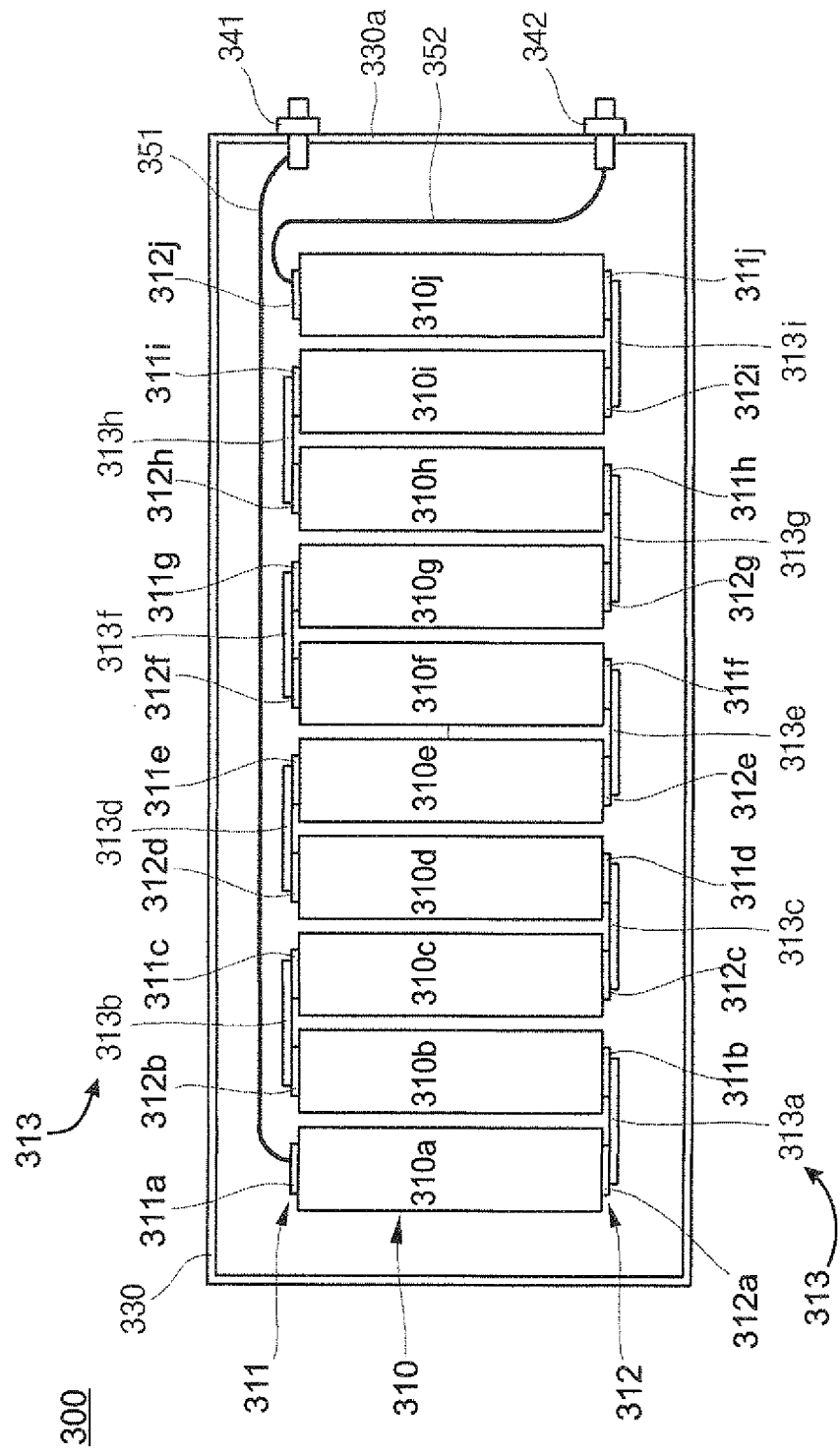
FIG. 8 is a plan view illustrating a battery pack applied to the battery pack stack of FIG. 7.

FIG. 7 is a perspective view illustrating a battery pack stack according to an embodiment of the invention, while FIG. 8 is a plan view illustrating a battery pack applied to the battery pack stack of FIG. 7.

Referring to FIG. 7, a battery pack stack 1000 may include a plurality of battery packs 300 (300*a* thru 300*f*), a plurality of first conductive external terminals 341 (341*a* thru 341*f*), a plurality of second conductive external terminals 342 (342*a* thru 342*f*), a first conductive external tab 361, and a second conductive external tab 362.

Referring to FIG. 8, each battery pack 300*a* thru 300*f* may include a plurality of battery cells 310, a battery case 330, the first conductive external terminal 341, the second conductive external terminal 342, a first conductive wire 351, and a second conductive wire 352. The number of battery packs 300 is six in FIG. 7, but the present disclosure is not limited thereto. The battery packs 300 are classified into first through sixth battery packs 300*a*, 300*b*, 300*c*, 300*d*, 300*e*, and 300*f*, respectively, which may be arrayed in parallel from a first end to a second end of stack 1000.

Each of the battery cells 310 in FIG. 8 may include a first conductive terminal 311 and a second conductive terminal 312. The number of the battery cells 310 is ten in FIG. 8, but the present disclosure is not limited thereto. The battery cells 310 are classified into first through tenth battery cells 310*a*, 310*b*, 310*c*, 310*d*, 310*e*, 310*f*, 310*g*, 310*h*, 310*i* and 310*j*, respectively, which may be arrayed in parallel from one side to another side. The battery cells 310 of FIG. 8 are different from the battery cells 110 of FIG. 2 in arrangement and structure, including lead lines 313. Thus, the battery cells 310 will now be described with respect to their arrangement and the lead lines 313.

Neighboring battery cells 310 may be electrically connected in series. In detail, a second conductive terminal 312*a* of the first battery cell 310*a* is electrically connected to a first conductive terminal 311*b* of the second battery cell 310*b*, a second conductive terminal 312*b* of the second battery cell 310*b* is electrically connected to a first conductive terminal 311*c* of the third battery cell 310*c*, a second conductive terminal 312*c* of the third battery cell 310*c* is electrically connected to a first conductive terminal 311*d* of the fourth battery cell 310*d*, a second conductive terminal 312*d* of the fourth battery cell 310*d* is electrically connected to a first conductive terminal 311*e* of the fifth battery cell 310*e*, a second conductive terminal 312*e* of the fifth battery cell 310*e* is electrically connected to a first conductive terminal 311*f* of the sixth battery cell 310*f*, a second conductive terminal 312*f* of the sixth battery cell 310*f* is electrically connected to a first conductive terminal 311*g* of the seventh battery cell 310*g*, a second conductive terminal 312*g* of the seventh battery cell 310*g* is electrically connected to a first conductive terminal 311*h* of the eighth battery cell 310*h*, a second conductive terminal 312*h* of the eighth battery cell 310*h* is electrically connected to a first conductive terminal 311*i* of the ninth battery cell 310*i*, and a second conductive terminal 312*i* of the ninth battery cell 310*i* is electrically connected to a first conductive terminal 311*j* of the tenth battery cell 310*j*.

The electrical series connection of the battery cells 310 may be achieved through the lead lines 313 (313*a* thru 313*i*). In detail, in the first through tenth battery cells 310*a*, 310*b*, 310*c*, 310*d*, 310*e*, 310*f*, 310*g*, 310*h*, 310*i* and 310*j*, the first conductive terminals 311*b*, 311*c*, 311*d*, 311*e*, 311*f*, 311*g*, 311*h*, 311*i* and 311*j* are electrically connected to the second conductive terminals 312*a*, 312*b*, 312*c*, 312*d*, 312*e*, 312*f*, 312*g*, 312*h* and 312*i*, respectively, through first through ninth lead lines 313*a*, 313*b*, 313*c*, 313*d*, 313*e*, 313*f*, 313*g*, 313*h* and 313*i*, respectively. The lead lines 313 may be formed of one of nickel (Ni), copper (Cu), aluminum (Al), an equivalent thereof, and a combination thereof.

The battery case 330 may have a box shape with an inner space. The battery case 330 may store the battery cells 310 in its inner space. The first and second conductive external terminals 341 and 342, which will be described later, may be fixed to the battery case 330. The battery case 330 may be formed of electrically insulating resin. The battery case 330 accommodates the battery cells 310 to protect them from environmental hazards such as shock and dust.

The first conductive external terminal 341 may be disposed in a side surface 330*a* of the battery case 330. The first conductive external terminal 341 is electrically connected to a first conductive terminal 311*a* of the first battery cell 310*a* via first conductive wire 351. The first conductive external terminal 341 may be exposed from the battery case 330 so as to electrically connect to another battery pack or an electronic device.

The second conductive external terminal 342 may be disposed in the side surface 330*a* of the battery case 330. The second conductive external terminal 342 is electrically connected to a second conductive terminal 312*j* of the tenth battery cell 310*j* via second conductive wire 352. The second conductive external terminal 342 may be exposed from the battery case 330 so as to electrically connect to another battery pack or an electronic device.

The first conductive wire 351 electrically connects the first conductive terminal 311*a* of the first battery cell 310*a* to the first conductive external terminal 341. The first conductive wire 351 may be a conducting wire which is formed of one of nickel (Ni), copper (Cu), aluminum (Al), an equivalent thereof, and a combination thereof, and which includes a sheathe formed of electrically insulating resin, but the present disclosure is not limited thereto.

The second conductive wire 352 electrically connects the second conductive terminal 312*j* of the tenth battery cell 310*j* to the second conductive external terminal 342. The second conductive wire 352 may be a conducting wire which is formed of one of nickel (Ni), copper (Cu), aluminum (Al), an equivalent thereof, and a combination thereof, and which includes a sheathe formed of electrically insulating resin, but the present disclosure is not limited thereto.

A battery pack used in the battery pack stack 1000 of FIG. 7 may be the battery pack 100 of FIG. 2, including the battery cells connected in parallel.

The first conductive external tab 361 of FIG. 7 electrically connects first conductive external terminals 341*a*, 341*b*, 341*c*, 341*d*, 341*e*, and 341*f* of the first through sixth battery packs 300*a*, 300*b*, 300*c*, 300*d*, 300*e* and 300*f*, respectively, to each other. An end of the first conductive external tab 361 may be provided with a first contact 361*a* which is electrically connected to an external device 10 through a first conducting wire 11.

The second conductive external tab 362 of FIG. 7 electrically connects second conductive external terminals 342*a*, 342*b*, 342*c*, 342*d*, 342*e* and 342*f* of the first through sixth battery packs 300*a*, 300*b*, 300*c*, 300*d*, 300*e* and 300*f*, respectively, to each other. An end of the second conductive external tab 362 may be provided with a second contact 362*a* which is electrically connected to the external device 10 through a second conducting wire 12. The second contact 362*a* is opposite to the first contact 361*a* with respect to the battery packs arrayed from the first end to the second end of the stack 1000.

Hereinafter, a configuration of a battery pack stack will now be described according to another embodiment.

Figure 9:
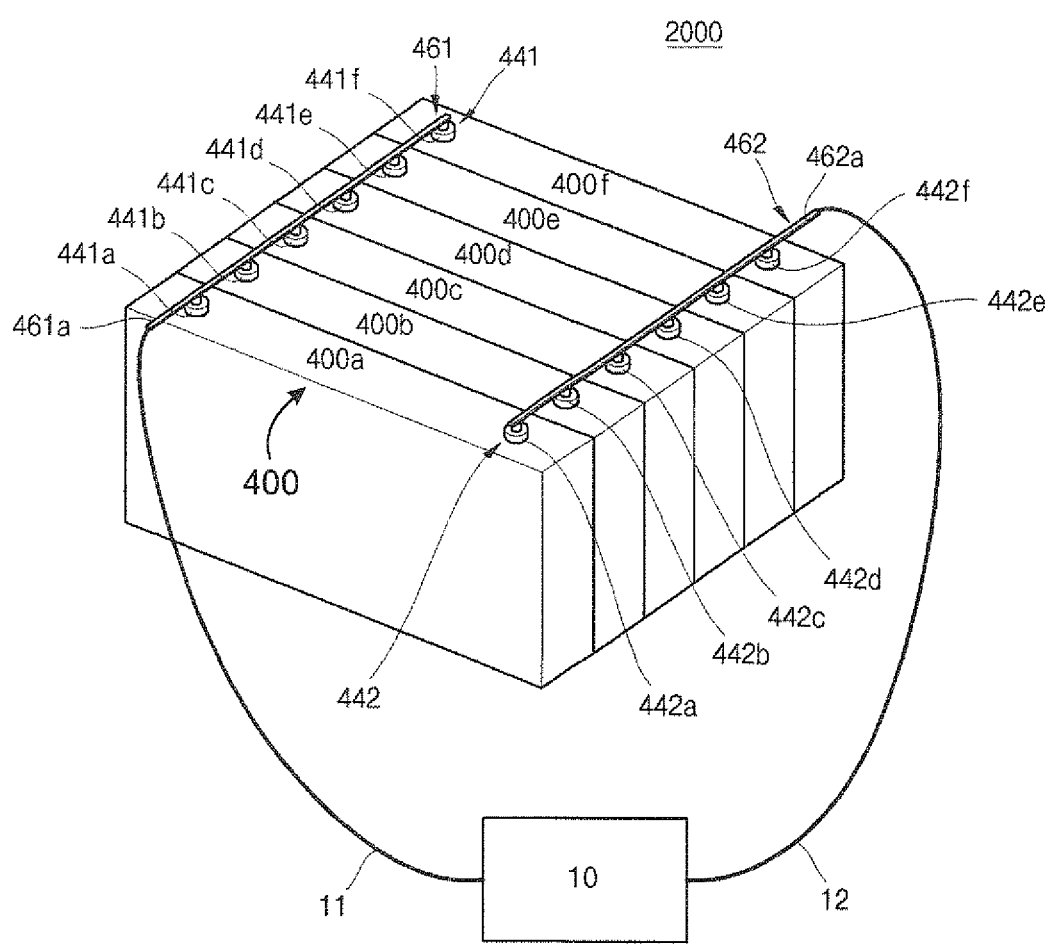
FIG. 9 is a perspective view illustrating a battery pack stack according to another embodiment of the invention.
Figure 10:
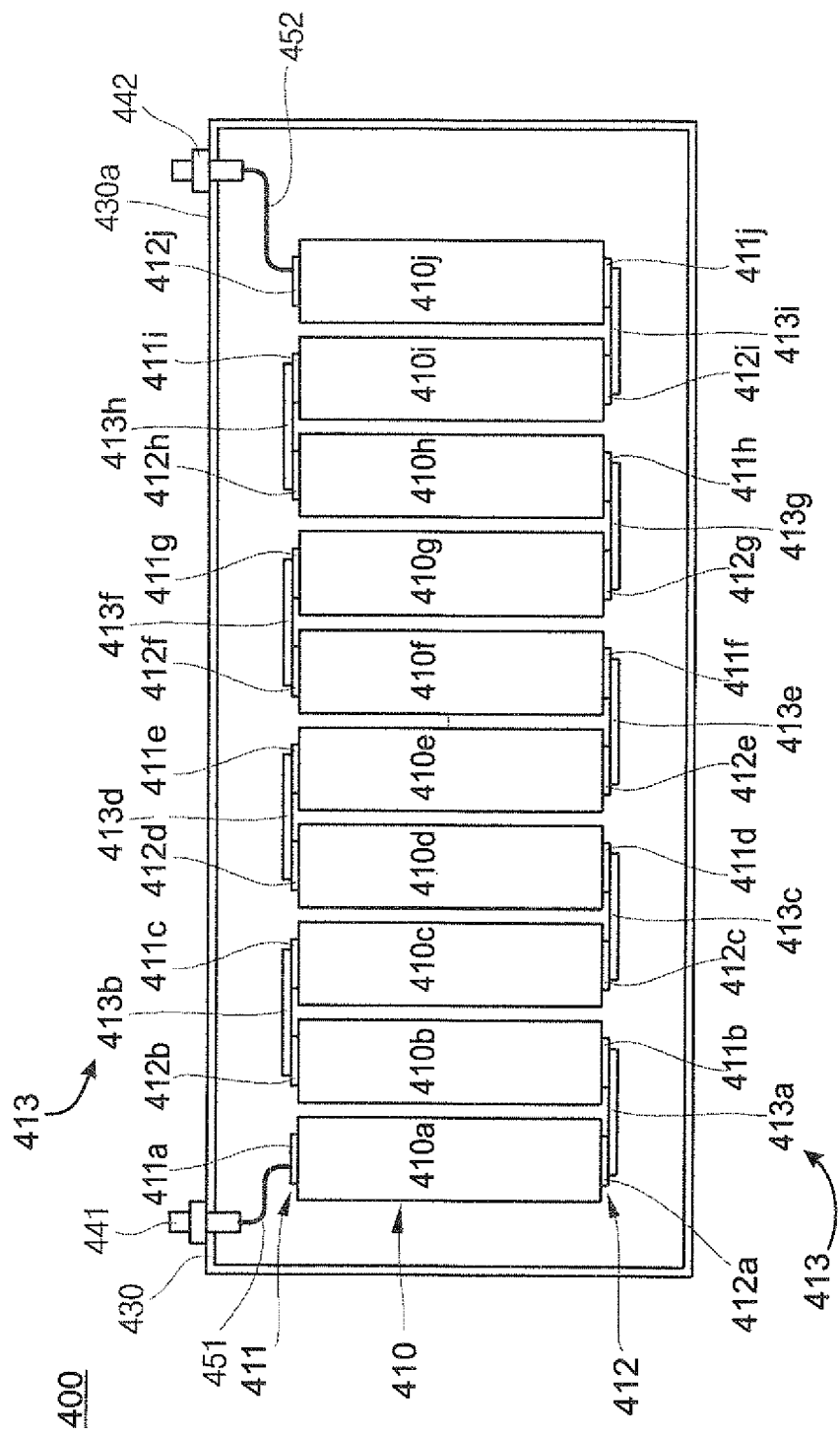
FIG. 10 is a plan view illustrating a battery pack applied to the battery pack stack of FIG. 9.

FIG. 9 is a perspective view illustrating a battery pack stack according to another embodiment of the invention, while FIG. 10 is a plan view illustrating a battery pack applied to the battery pack stack of FIG. 9.

Referring to FIG. 9, a battery pack stack 2000 may include a plurality of battery packs 400 (400*a* thru 400*f*), a plurality of first conductive external terminals 441 (441*a* thru 441*f*), a plurality of second conductive external terminals 442 (442*a* thru 442*f*), a first conductive external tab 461, and a second conductive external tab 462.

Referring to FIG. 10, each battery pack 400*a* thru 400*f* includes a plurality of battery cells 410, a battery case 430, the first conductive external terminal 441, the second conductive external terminal 442, a first conductive wire 451, and a second conductive wire 452. The number of battery packs 400 is six in FIG. 9, but the present disclosure is not limited thereto. The battery packs 400 are classified into first through sixth battery packs 400*a*, 400*b*, 400*c*, 400*d*, 400*e* and 400*f* which may be arrayed in parallel from a first end to a second end of stack 2000.

The battery pack stack 2000 of FIG. 9 is different from the battery pack stack 1000 of FIG. 7 with respect to the configuration of battery case 430 (FIG. 10), the first conductive external terminal 441 (FIG. 10), the second conductive external terminal 442 (FIG. 10), the first conductive wire 451 (FIG. 10), the second conductive wire 452 (FIG. 10), the first conductive external tab 461 (FIG. 9), and the second conductive external tab 462 (FIG. 9). Thus, the battery pack stack 2000 will now be described with respect to the battery case 430 (FIG. 10), the first conductive external terminal 441, the second conductive external terminal 442, the first conductive wire 451, the second conductive wire 452, the first conductive external tab 461 (FIG. 9), and the second conductive external tab 462. A further description of elements common to the battery pack stack 1000 of FIG. 7 and the battery pack stack 2000 of FIG. 9 will be omitted.

The battery case 430 (FIG. 10) may have a box shape with an inner space. The battery case 430 may store the battery cells 410 in its inner space. The first and second conductive external terminals 441 and 442, respectively, which will be described later, may be fixed to the battery case 430. The battery case 430 may be formed of electrically insulating resin. The battery case 430 accommodates the battery cells 410 to protect them from environmental hazards such as shock and dust.

The first conductive external terminal 441 may be disposed in an upper surface 430*a* of the battery case 430. The first conductive external terminal 441 is electrically connected to the first conductive terminal 411*a* of the first battery cell 410*a* via the first conductive wire 451. The first conductive external terminal 441 may be exposed from the battery case 430 so as to electrically connect to another battery pack or an electronic device.

The second conductive external terminal 442 may be disposed in the upper surface 430*a* of the battery case 430. The first conductive external terminal 442 is electrically connected to the second conductive terminal 412*j* of the tenth battery cell 410*j* via the second electrical wire 452. The second conductive external terminal 442 may be exposed from the battery case 430 so as to electrically connect to another battery pack or an electronic device.

The first conductive wire 451 electrically connects the first conductive terminal 411*a* of the first battery cell 410*a* to the first conductive external terminal 441. The first conductive wire 451 may be a conducting wire which is formed of one of nickel (Ni), copper (Cu), aluminum (Al), an equivalent thereof, and a combination thereof, and which includes a sheathe formed of electrically insulating resin, but the present disclosure is not limited thereto.

The second conductive wire 452 may electrically connect the second conductive terminal 412*j* of the tenth battery cell 410*j* to the second conductive external terminal 442. The second conductive wire 452 may be a conducting wire which is formed of one of nickel (Ni), copper (Cu), aluminum (Al), an equivalent thereof, and a combination thereof, and which includes a sheathe formed of electrically insulating resin, but the present disclosure is not limited thereto.

The battery packs 400 (FIG. 9) used in the battery pack stack 2000 may be similar to the battery packs 200, including the battery cells 110 connected in parallel, as illustrated in FIG. 3.

The first conductive external tab 461 (FIG. 9) electrically connects first conductive external terminals 441*a*, 441*b*, 441*c*, 441*d*, 441*e* and 441*f* of the first through sixth battery packs 400*a*, 400*b*, 400*c*, 400*d*, 400*e* and 400*f*, respectively, to each other. An end of the first conductive external tab 461 may be provided with a first contact 461*a* which is electrically connected to the external device 10 through the first conducting wire 11.

The second conductive external tab 462 electrically connects second conductive external terminals 442*a*, 442*b*, 442*c*, 442*d*, 442*e* and 442*f* of the first through sixth battery packs 400*a*, 400*b*, 400*c*, 400*d*, 400*e* and 400*f*, respectively, to each other. An end of the second conductive external tab 462 may be provided with a second contact 462*a* which is electrically connected to the external device 10 through the second conducting wire 12. The second contact 462*a* is opposite to the first contact 461*a* with respect to the battery packs 400 arrayed from the first end to the second end of stack 2000.

Therefore, in the battery pack stack configured according to the invention, the charge/discharge speed of the battery pack disposed on an end is similar to that of the battery pack disposed on the other end. In addition, temperature differences between the battery packs according to the invention are decreased, unlike the related art in which the temperature difference between a battery pack disposed on an end of a battery pack stack and a battery pack disposed on the other end is increased during charge/discharge. That is, in the battery pack stack configured according to the invention, a balance between the battery packs is well maintained.

As described above, the battery cells of the battery pack according to the invention are uniformly charged/discharged so as to improve the balance between the battery cells, thus preventing continual degradation from being concentrated on a battery cell disposed on a side. Accordingly, the service life distribution of the battery cells can be uniform, and the possibility of accidents can be reduced.

In addition, the battery packs of the battery pack stack according to the invention are uniformly charged/discharged so as to improve the balance between the battery packs. In addition, the battery pack stack according to the invention can prevent temperature increase from being concentrated on the battery pack disposed at an end of the battery pack stack. Accordingly, temperature distribution between the battery packs is uniform so that the service life distribution of the battery packs can be uniform and the possibility of accidents can be reduced.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and detail may be made without departing from the spirit and scope of the present invention as set forth in the following claims.

What is claimed is:

1. A battery pack, comprising:
 a plurality of battery cells arrayed in a linear file extending in a first direction from a first side to a second side of the battery pack, each battery cell including a first conductive terminal protruding from a body of said each battery cell in one same direction crossing the first direction and a second conductive terminal protruding from the body of said each battery cell in another same direction crossing the first direction;

a first conductive tab electrically connecting the first conductive terminals of the battery cells together;

a second conductive tab electrically connecting the second conductive terminals of the battery cells together;

a first conductive external terminal electrically connected to the first conductive tab via a first connection portion positioned at the first side and configured to be electrically connected to an external device; and a second conductive external terminal electrically connected to the second conductive tab via a second connection portion positioned at the second side and configured to be electrically connected to the external device.

2. The battery pack as claimed in claim 1, further comprising a battery case accommodating the battery cells and configured to fix the first and second conductive external terminals.

3. The battery pack as claimed in claim 2, wherein each first conductive terminal is disposed at an upper side of a respective battery cell, and each second conductive terminal is disposed at a lower side of said respective battery cell.

4. The battery pack as claimed in claim 3, wherein the first and second conductive external terminals are disposed in a side surface of the battery case.

5. The battery pack as claimed in claim 3, wherein the first and second conductive external terminals are disposed in an upper surface of the battery case.

6. The battery pack as claimed in claim 1, wherein the first and second conductive tabs have plate shapes, and are formed of one of nickel (Ni), copper (Cu), aluminum (Al), an equivalent thereof, and a combination thereof.

7. The battery pack as claimed in claim 1, wherein the first conductive tab is electrically connected to the first conductive external terminal through a first conductive wire, and the second conductive tab is electrically connected to the second conductive external terminal through a second conductive wire.

8. The battery pack as claimed in claim 7, wherein a portion where the first conductive tab is connected to the first conductive wire is an end of the first conductive tab, wherein a portion where the second conductive tab is connected to the second conductive wire is an end of the second conductive tab, and wherein the end of the first conductive tab is opposite to the end of the second conductive tab with respect to the battery cells arrayed from the first side to the second side of the battery pack.

9. The battery pack as claimed in claim 1, wherein the battery cell comprises a cylinder type secondary battery.

10. A battery pack stack, comprising:

a plurality of battery packs arrayed in a linear file extending in a first direction from a first end to a second end of the battery pack stack, each battery pack comprising a plurality of battery cells and including a first conductive external terminal protruding from a body of said each battery pack in one same direction crossing the first direction and a second conductive external terminal protruding from the body of said each battery pack in another same direction crossing the first direction;

a first conductive external tab including a first contact at the first end and electrically connecting the first conductive external terminals together; and a second conductive external tab including a second contact at the second end and electrically connecting the second conductive external terminals together, the first and second contacts connected to an external device.

11. The battery pack stack as claimed in claim 10, wherein each battery pack comprises:

the plurality of battery cells, each battery cell including a first conductive terminal and a second conductive terminal, and electrically connected to each other; and a battery case accommodating the battery cells and configured to fix the first and second conductive external terminals.

12. The battery pack stack as claimed in claim 11, wherein the battery cells are electrically connected to each other in series.

13. The battery pack stack as claimed in claim 11, wherein the battery cells are electrically connected to each other in parallel.

14. The battery pack stack as claimed in claim 11, wherein the plurality of battery cells of each battery pack are arrayed in a linear file extending in a second direction from a first side to a second side of said each battery pack, and each battery cell includes a first conductive terminal protruding from a body of said each battery cell in one same direction crossing the second direction and a second conductive terminal protruding from the body of said each battery cell in another same direction crossing the second direction, wherein said each battery pack comprises:

a first conductive tab electrically connecting the first conductive terminals of the battery cells to each other; and a second conductive tab electrically connecting the second conductive terminals of the battery cells to each other, wherein the first conductive tab is electrically connected to the first conductive external terminal via a first connection portion positioned at the first side of said each battery pack, and wherein the second conductive tab is electrically connected to the second conductive external terminal via a second connection portion positioned at the second side of said each battery pack.

15. The battery pack stack as claimed in claim 11, wherein the first conductive external terminal is disposed at an upper side of said each battery cell, and the second conductive external terminal is disposed at a lower side of said each battery cell.

16. The battery pack stack as claimed in claim 15, wherein the first and second conductive external terminals are disposed in a side surface of the battery case.

17. The battery pack stack as claimed in claim 15, wherein the first and second conductive external terminals are disposed in an upper surface of the battery case.

18. The battery pack stack as claimed in claim 11, wherein each battery cell comprises a cylinder type secondary battery.

* * * * *